(12) United States Patent
Marmara et al.

(10) Patent No.: US 11,371,573 B2
(45) Date of Patent: Jun. 28, 2022

(54) METHODS AND SYSTEMS FOR EMI ASSESSMENT FOR BRAKE PAD WEAR ESTIMATION

(71) Applicant: GM GLOBAL TECHNOLOGY OPERATIONS LLC, Detroit, MI (US)

(72) Inventors: Stacey M. Marmara, Markham (CA); Hung H. Nguyen, Toronto (CA); Nojan Medinei, Toronto (CA); Turjo Imam, Rochester Hills, MI (US); Michael L Mandziuk, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 267 days.

(21) Appl. No.: 16/813,133

(22) Filed: Mar. 9, 2020

(65) Prior Publication Data

US 2021/0277971 A1 Sep. 9, 2021

(51) Int. Cl.
*F16D 66/02* (2006.01)
*B60T 17/22* (2006.01)
*F16D 66/00* (2006.01)

(52) U.S. Cl.
CPC .......... *F16D 66/026* (2013.01); *B60T 17/221* (2013.01); *F16D 2066/006* (2013.01)

(58) Field of Classification Search
CPC .... B60T 17/221; F16D 66/026; F16D 66/022; F16D 2066/006; F16D 66/02
See application file for complete search history.

(56) References Cited

U.S. PATENT DOCUMENTS

| | | | |
|---|---|---|---|
| 5,975,250 A * | 11/1999 | Brandmeier | B60T 8/321 188/1.11 E |
| 2017/0355356 A1* | 12/2017 | Okada | B60T 7/042 |
| 2018/0031065 A1 | 2/2018 | Shabbir et al. | |
| 2019/0135257 A1 | 5/2019 | Medinei et al. | |
| 2020/0001849 A1 | 1/2020 | Medinei et al. | |

* cited by examiner

*Primary Examiner* — Pamela Rodriguez
(74) *Attorney, Agent, or Firm* — Quinn IP Law

(57) ABSTRACT

A method for performing a data validity assessment for a brake pad wear estimation includes providing an electric park brake assembly including a motor and a battery management sensor, receiving motor current data from the motor of the electric park brake assembly, receiving battery current data from the battery management sensor, determining a margin of current from the motor current data and the battery current data, receiving historical motor position data and instant motor position data of the motor, calculating the brake pad wear estimation using the motor current data, comparing the historical motor position data and the instant motor position data against an expected range of motor positions, determining an electromagnetic interference level from the margin of current, the historical and instant motor position data, and the calculated brake pad wear estimation, and discarding the motor current data when the electromagnetic interference level is above a predetermined threshold.

20 Claims, 4 Drawing Sheets

METHODS AND SYSTEMS FOR EMI ASSESSMENT FOR BRAKE PAD WEAR ESTIMATION

INTRODUCTION

The present disclosure relates generally to brake pad life determination methods and systems that incorporate an electromagnetic interference (EMI) assessment.

Vehicles include disc brakes for slowing the rotation of a wheel or another driven component. A disc brake may include a brake pad, a brake caliper, and a brake disc, which is also known as a rotor. The brake disc is operatively connected to the wheel, and the brake caliper is operatively coupled to the brake pad. During operation, the brake caliper can press the brake pad against the brake disc. As a consequence, the friction between the brake pad and the brake disc causes the brake disc (and the wheel attached to the brake disc) to slow or stop.

SUMMARY

Because the brake pad is subjected to friction during use, the brake pad may wear over time. It is therefore useful to monitor the wear of the brake pad in order to determine when the brake pad is about to reach the end of its life (i.e., when the brake pad should be replaced). Current estimation methods of the remaining brake pad lining life (thickness) rely on physical sensors that wear with the linings, providing feedback of their status. In order to use methods, such as an Electric Park Brake (EPB) Motor on Caliper (MOC), to indirectly measure pad thickness, system-level electromagnetic interference (EMI) should be considered as it can adversely affect performance metrics such as repeatability and accuracy. The methods and systems disclosed herein detect EMI using various factors to recognize if EMI has adversely affected the brake pad height determination.

Embodiments according to the present disclosure provide advantages including, for example and without limitation, evaluating vehicle data to detect EMI and assessing the EMI data to determine whether the measured brake pad height determination data is valid or should be discarded, thereby reducing system error and increasing measurement accuracy.

In one aspect of the present disclosure, a method for performing an electromagnetic interference assessment for a brake pad wear estimation includes providing a brake assembly including an electric park brake and a motor coupled to the electric park brake, providing a sensor configured to provide battery current data, and providing a controller electronically connected to the brake assembly and the sensor. The method includes receiving, by the controller, motor current data and measured motor travel data from the motor coupled to the electric park brake, receiving, by the controller, battery current data from the sensor, calculating, by the controller, a margin of current from the motor current data and the battery current data, calculating, by the controller, the brake pad wear estimation from the motor current data, determining, by the controller, an expected motor travel of the motor coupled to the electric park brake, and analyzing, by the controller, the margin of current data, the measured motor travel data, the expected motor travel, and the calculated brake pad wear estimation to determine if a first condition is satisfied. When the first condition is satisfied, the method includes revising, by the controller, the calculated brake pad wear estimation using the motor current data and when the first condition is not satisfied, discarding the motor current data.

In some aspects, the expected motor travel is calculated as $D_i^{exp} = D_{i-1}^{meas} + \int_0^T w(t)dt$ for i=1, 2, ... N, where $D_i^{exp}$ is the expected motor travel at a test instance i, $D_{i-1}^{meas}$ is an actual measured motor travel distance from a previous test, w(t) is an energy-based function representing a brake pad wear behavior of the electric park brake over time, and T is an elapsed time between a test i−1 to a test i.

In some aspects, the first condition is an electromagnetic interference level below a predetermined threshold such that the motor current data is determined to be valid.

In some aspects, the electromagnetic interference level is determined from an analysis of pulses in a period of measurements of the motor current data.

In some aspects, the analysis of pulses in the motor current data includes determining, by the controller, when one or more pulses are expected and missing in the motor current data, and, when the one or more pulses are missing in the motor current data, determining, by the controller, the electromagnetic interference level is above the predetermined threshold.

In some aspects, the electromagnetic interference level is determined from an analysis of a frequency of pulses in a period of measurements of the motor current data.

In some aspects, the analysis of the frequency of pulses in the motor current data includes determining when an increased frequency of an expected pulse is observed, and, when the increased frequency is observed, determining, by the controller, the electromagnetic interference level is above the predetermined threshold.

In some aspects, the method further includes determining, by the controller, a calibrated threshold of the battery current data and discarding, by the controller, the measured motor travel data when the battery current is above the calibrated threshold.

In another aspect of the present disclosure, a method for performing a data validity assessment for a brake pad wear estimation includes providing an electric park brake assembly including a motor and a battery management sensor and a controller in electronic communication with the motor and the battery management sensor. The method includes receiving, by the controller, motor current data from the motor of the electric park brake assembly, receiving, by the controller, battery current data from the battery management sensor, determining, by the controller, a margin of current from the motor current data and the battery current data, receiving, by the controller, historical motor position data of the motor and instant motor position data of the motor, calculating, by the controller, the brake pad wear estimation using the motor current data, comparing, by the controller, the historical motor position data and the instant motor position data against an expected range of motor positions, determining, by the controller, an electromagnetic interference level from the margin of current, the historical and instant motor position data, and the calculated brake pad wear estimation; and discarding, by the controller, the motor current data when the electromagnetic interference level is above a predetermined threshold.

In some aspects, the method further includes determining, by the controller when the electromagnetic interference level is below a predetermined threshold such that the motor current data is determined to be valid.

In some aspects, the method further includes revising, by the controller, the calculated brake pad wear estimation using the motor current data when the motor current data is determined to be valid.

In some aspects, the electromagnetic interference level is determined from an analysis of pulses in a period of measurements of the motor current data.

In some aspects, the analysis of pulses in the motor current data includes determining, by the controller, when one or more pulses are expected and missing in the motor current data, and, when the one or more pulses are missing in the motor current data, determining, by the controller, that the electromagnetic interference level is above the predetermined threshold.

In some aspects, the electromagnetic interference level is determined from an analysis of a frequency of pulses in a period of measurements of the motor current data.

In some aspects, the analysis of the frequency of pulses in the motor current data includes determining when an increased frequency of an expected pulse is observed, and, when the increased frequency is observed, determining, by the controller, the electromagnetic interference level is above the predetermined threshold.

In another aspect of the present disclosure, an automotive vehicle includes a vehicle body enclosing a propulsion system including a vehicle battery and a wheel coupled to the vehicle body, a sensor coupled to the vehicle battery and configured to provide battery current data, a brake assembly coupled to the wheel, the brake assembly including an electric park brake and a motor coupled to the electric park brake, and a controller electronically connected to the brake assembly and the sensor. The controller is configured to, receive motor current data and measured motor travel data from the motor coupled to the electric park brake, receive battery current data from the sensor coupled to the vehicle battery, calculate a margin of current from the motor current data and the battery current data, calculate a brake pad wear estimation from the motor current data, determine an expected motor travel of the motor coupled to the electric park brake, and analyze the margin of current data, the measured motor travel data, the expected motor travel, and the calculated brake pad wear estimation to determine if a first condition is satisfied. When the first condition is satisfied, the controller is configured to revise the calculated brake pad wear estimation using the motor current data and when the first condition is not satisfied, discard the motor current data.

In some aspects, the expected motor travel is calculated as $D_i^{exp} = D_{i-1}^{meas} + \int_0^T w(t)dt$ for $i = 1, 2, \ldots N$, where $D_i^{exp}$ is the expected motor travel at a test instance i, $D_{i-1}^{meas}$ is an actual measured motor travel distance from a previous test, w(t) is an energy-based function representing brake pad wear behavior over time, and T is an elapsed time between a test i−1 to a test i.

In some aspects, the first condition is an electromagnetic interference level below a predetermined threshold such that the motor current data is determined to be valid.

In some aspects, the controller is further configured to determine the electromagnetic interference level from an analysis of pulses in a period of measurements of the motor current data.

In some aspects, the analysis of pulses in the motor current data includes determining when one or more pulses are expected and missing in the motor current data, and, when the one or more pulses are missing in the motor current data, determining the electromagnetic interference level is above the predetermined threshold.

BRIEF DESCRIPTION OF THE DRAWINGS

The present disclosure will be described in conjunction with the following figures, wherein like numerals denote like elements.

Figure 1:
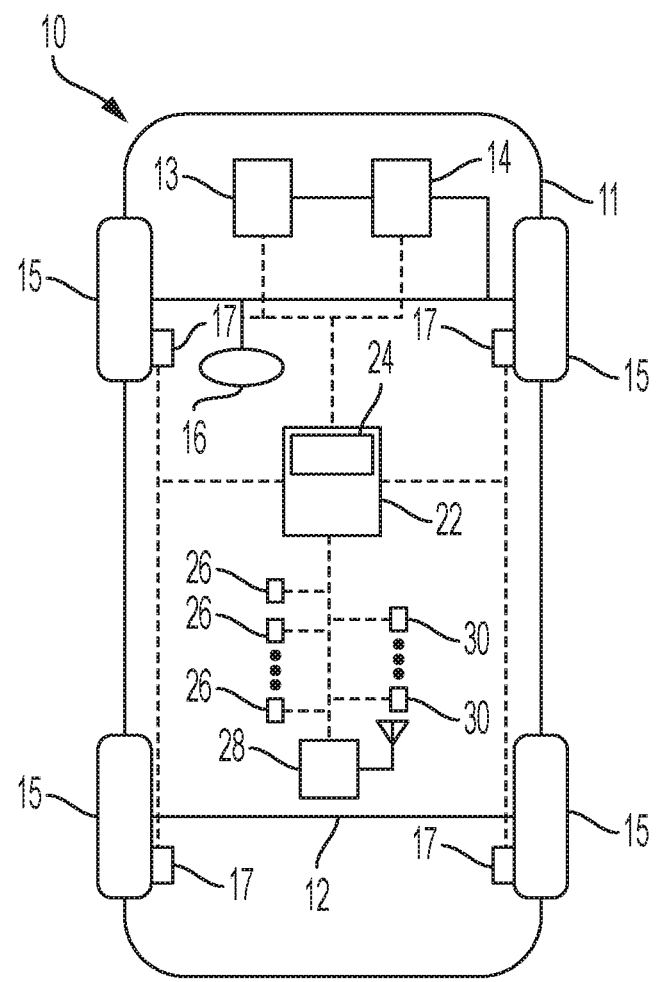
FIG. 1 is a schematic diagram of a vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 generally includes a body 11, a chassis 12, and wheels 15. The body 11 is arranged on the chassis 12 and substantially encloses the other components of the vehicle 10. The body 11 and chassis 12 may jointly form a frame. The wheels 15 are each rotationally coupled to the chassis 12 near a respective corner of the body 11. The vehicle 10 is depicted in the illustrated embodiment as a passenger car, but it should be appreciated that any other vehicle including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system and may also include a 12V battery. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously variable transmission, or other appropriate transmission. The vehicle 10 additionally includes a brake assembly 17 configured to provide braking torque to the vehicle wheels 15. The brake assembly 17 may, in various embodiments, include friction brakes, a regenerative braking system such as an electric machine, an electrically actuated parking brake (EPB) including an electronic brake control module and motor, and/or other appropriate braking systems. In some embodiments, the brake assembly 17 is an electromechanical brake assembly that includes at least one brake pad, a brake caliper, a brake rotor, and a drive unit, as disclosed in U.S. patent application Ser. No. 15/220,829, filed Jul. 27, 2016, titled "AN ELECTROMECHANICAL BRAKE SYSTEM AND METHOD," and incorporated herein by reference in its entirety.

The vehicle 10 additionally includes a steering system 16. In various embodiments, the vehicle 10 also includes a wireless communication system 28. In some embodiments, the wireless communication system 28 includes a navigation system configured to provide location information in the form of GPS coordinates (longitude, latitude, and altitude/elevation) to a controller 22. In some embodiments, the wireless communication system 28 may include a Global Navigation Satellite System (GNSS) configured to communicate with global navigation satellites to provide autonomous geo-spatial positioning of the vehicle 10. In the illustrated embodiment, the wireless communication system 28 includes an antenna electrically connected to a receiver.

With further reference to FIG. 1, the vehicle 10 also includes a sensing system including a plurality of sensors 26 configured to measure and capture data on one or more vehicle characteristics, including but not limited to vehicle speed, vehicle heading, vehicle location, brake pedal travel, brake pedal depression frequency, brake pad thickness, motor current, 12V battery current, motor travel, etc., for example. In the illustrated embodiment, the sensors 26 include, but are not limited to, an accelerometer, a speed sensor, a heading sensor, a wear sensor, or other sensors that sense observable conditions of the vehicle or the environment surrounding the vehicle and may include RADAR, LIDAR, optical cameras, thermal cameras, ultrasonic sensors, and/or additional sensors as appropriate. The vehicle 10 also includes a plurality of actuators 30 configured to receive control commands to control steering, shifting, throttle, braking, or other aspects of the vehicle 10, as discussed in greater detail below.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle, including the brake assembly 17. In various embodiments, the controller 22 includes or is in electronic communication with an intelligent battery management sensor 24 that includes a vehicle battery, such as a 12V battery. The intelligent battery management sensor 24 is configured to provide battery current data and battery state of charge (SOC)/state of health (SOH) data that is used in the EMI assessment discussed herein.

Figure 2:
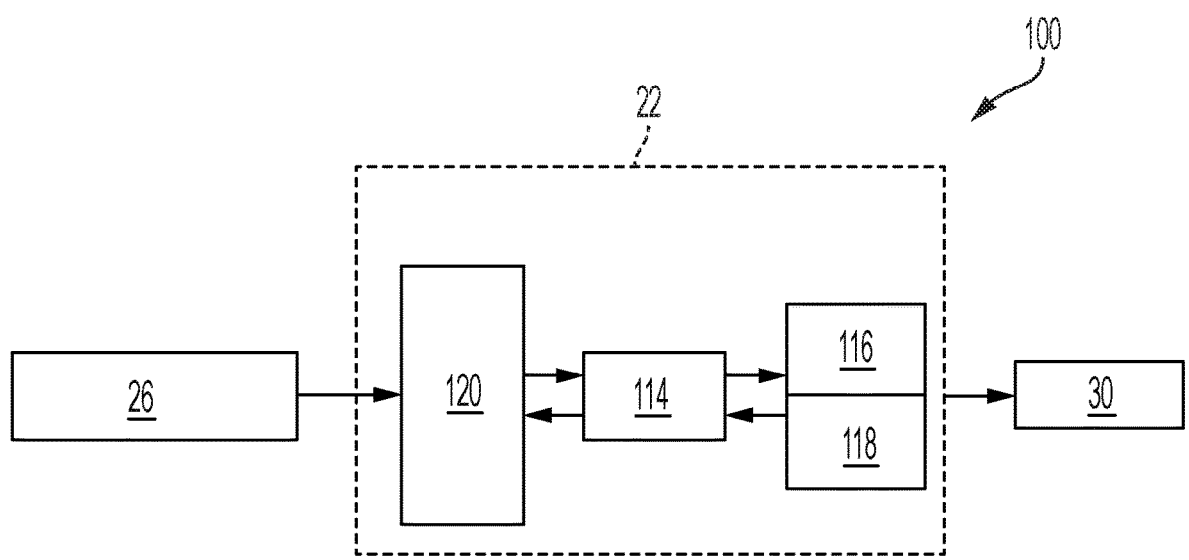
FIG. 2 is a block diagram of a system for performing a brake pad wear check and an EMI assessment, according to an embodiment.

FIG. 2 illustrates an exemplary system 100 for adaptively performing a brake pad wear check, including performing an assessment of system level EMI. The processor/controller device 22 includes a central processing unit (CPU) 114 coupled to memory devices 116, 118. The CPU 114 is coupled through an input/output (I/O) interface 120 to at least one of the plurality of sensors 26, discussed herein with respect to FIG. 1. The sensors 26 are configured to measure various operational parameters of the vehicle 10 including EPB motor current, 12V battery current, motor travel, etc., for example and without limitation. The controller 22 generates one or more control signals and transmits the control signals to at least one of the plurality of actuators 30, including, for example and without limitation, one or more actuators 30 configured to control the brake assembly 17.

The brake assembly 17 are understood by those skilled in the art as exemplary mechanisms for providing vehicle braking and include, in various embodiments, a mechanism for measuring the thickness of a brake pad and/or rotor to monitor brake pad and/or rotor wear. The mechanism for measuring brake pad and/or rotor wear includes, in various embodiments, an electromechanical parking brake motor on caliper (EPB MOC). The methods for EMI assessment as part of an overall brake pad wear determination may be used with any brake pad lining measurement technologies including the electromechanical brake components discussed herein. In various embodiments, the methods for EMI assessment discussed herein are used with the brake pad lining measurement systems and methods discussed in U.S. patent application Ser. No. 15/802,711, filed Nov. 3, 2017, titled "METHODS AND SYSTEMS TO ADAPTIVELY MONITOR BRAKE PAD WEAR," and incorporated herein by reference in its entirety and U.S. patent application Ser. No. 16/020,103, filed Jun. 27, 2018, titled "METHODS AND SYSTEMS FOR BRAKE PAD LIFE DETERMINATION," and incorporated herein by reference in its entirety.

The brake pad wear methods and algorithms disclosed in U.S. patent application Ser. No. 15/802,711 include expected wear calculations including thermal and/or wear model calculations that provide an estimate of brake pad thickness. The expected wear calculation includes information from a variety of vehicle sensors, such as the sensors 26, including vehicle speed, vehicle deceleration rate, brake pedal position, the time elapsed since a previous brake wear test, vehicle mileage since a previous brake pad wear test, etc. to determine a vehicle braking profile. The expected wear calculation is an estimated value of the brake pad thickness based on vehicle usage since the previous test, such as, for example, an electric parking brake motor on caliper (EPB MOC) brake pad wear test. The expected wear calculation provides a base estimate of the brake pad thickness but is supplemented by frequent brake pad thickness measurement tests (such as additional EPB MOC brake pad wear tests) to provide a more accurate expected wear prediction.

The EPB MOC brake pad wear test incorporates motor position to determine brake pad height. However, system level EMI can adversely affect the accuracy of the measured data. Comparisons of EPB amperage data with system amperage data, calculated brake pad wear estimation using the motor current data, and expected motor travel with measure motor travel are indicators of brake pad height determination validity and indicate when system level EMI is detected. When system level EMI is detected, a determination is made whether to discard the measured data or include the measured data in the brake pad wear methods and algorithm.

Figure 3:
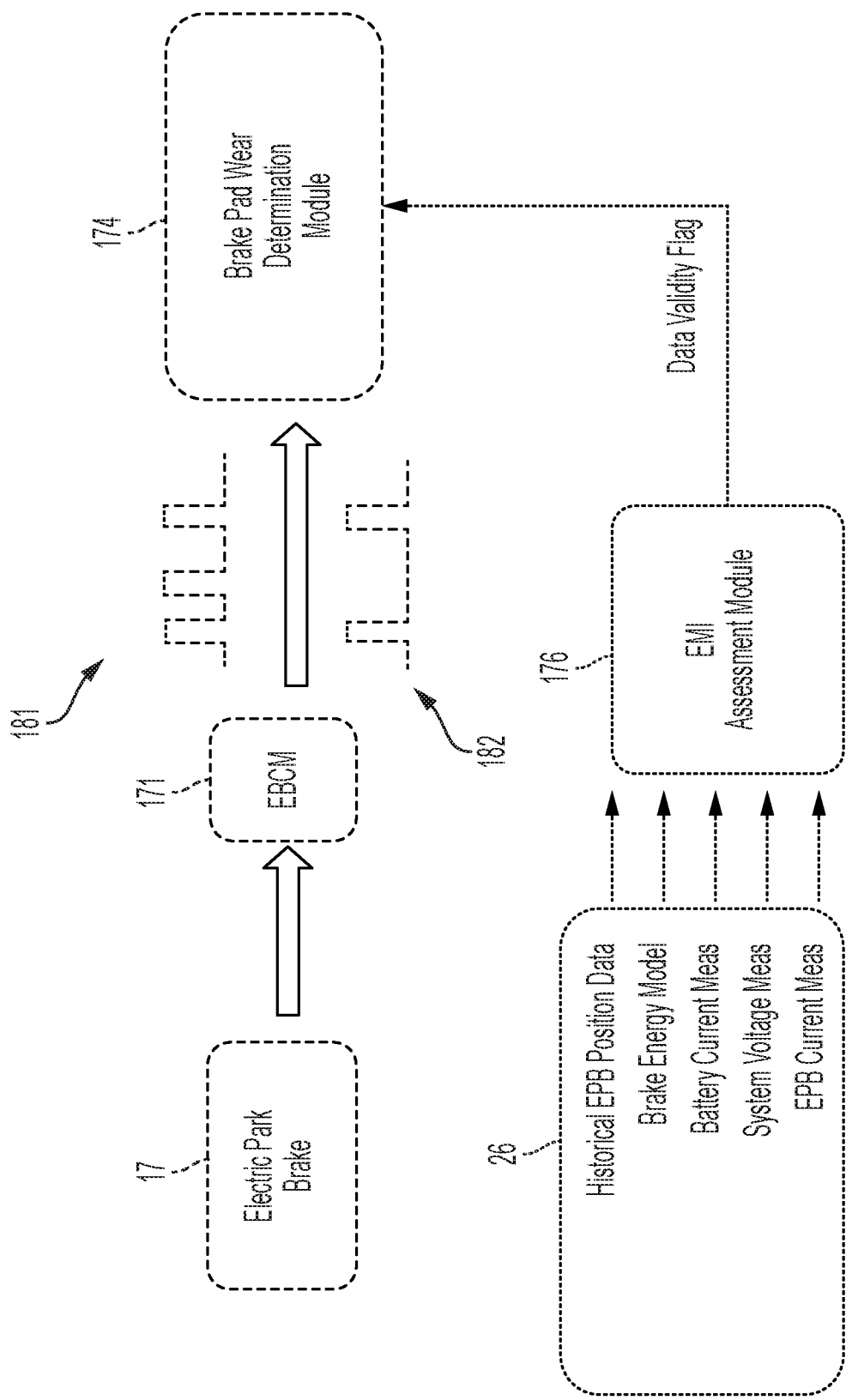
FIG. 3 is a schematic block diagram of the integration of an EMI assessment as part of an adaptive brake pad wear monitoring method, according to an embodiment.

An exemplary block diagram of the integration of an EMI assessment algorithm into a brake pad wear determination method is shown in FIG. 3. The brake assembly 17 includes an electric park brake (EPB). Data from the electric park brake is received by an electric brake control module (EBCM) 171. The electric brake control module 171 is, in various embodiments, in electronic communication with the controller 22, which receives data regarding the motor amperage waves or ripples. The amperage waves illustrated by reference 181 indicate an ideal condition, that is, amperage data without EMI. The amperage waves illustrated by reference 182 indicate amperage data including EMI. The amperage data indicated by 181 and 182 is received by a brake pad wear determination module 174. In various embodiments, the brake pad wear determination module 174 is a module housed within or in electronic communication with a controller, such as the controller 22.

As discussed, EMI can adversely affect the accuracy of the measured data from the brake assembly 17 including the electric park brake. Vehicle characteristic data measured by the plurality of sensors 26, as well as data analyzed by one or more controllers of the vehicle, including the controller 22 and the EBCM 171, is used by an EMI assessment module 176 to make a validity determination regarding the measure data. With continued reference to FIG. 3, vehicle characteristic data such as historical EPB position data, a brake energy model, a measured battery current, a measured system voltage, and a measured EPB current, for example and without limitation, are received by the EMI assessment module 176. In various embodiments, the EMI assessment module 176 is a module housed within or in electronic communication with a controller, such as the controller 22. The EMI assessment module 176 performs a comparison of the EPB amperage data with system amperage data, calculated expected brake pad wear estimation, expected motor travel with measured motor travel, and negative battery terminal circuit data synthesized with pad height measurement statistical data to recognize if EMI has impacted the measurement data. If the determination made by the EMI assessment module 176 is positive, that is, that EMI has impacted the measurement data, a data validity flag is set, and the measurement is excluded from calculation of the brake pad wear determination by the brake pad wear determination module 174.

Figure 4:
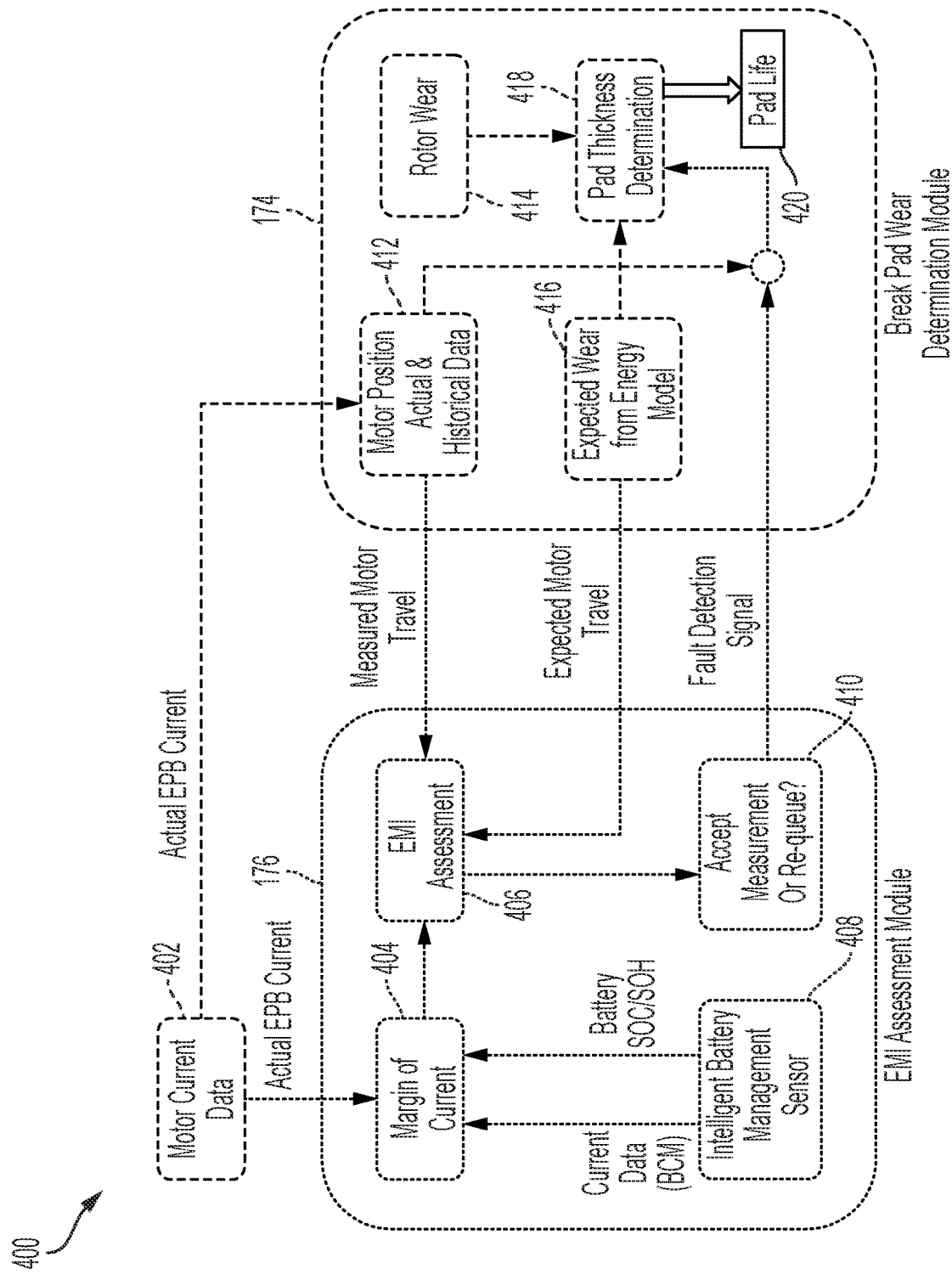
FIG. 4 is a schematic diagram of a method to perform a brake pad wear determination including EMI assessment of data validity, according to an embodiment.

FIG. 4 illustrates a method 400 to perform a brake pad wear determination including EMI assessment of data validity, according to an embodiment. The method 400 can be utilized in connection with the modules and systems disclosed herein, including the brake pad wear determination module 174 and the EMI assessment module 176. The method 400 can be utilized in connection with the controller 22 as discussed herein, or by other systems associated with or separate from the vehicle, in accordance with exemplary embodiments. The order of operation of the method 400 is not limited to the execution as illustrated in FIG. 4, but may be performed in one or more varying orders, or steps may be performed simultaneously, as applicable in accordance with the present disclosure.

The acquisition of EPB motor position data for use in brake pad wear determinations has system level vulnerabilities due to several factors. The motor position determination by an electronic control unit (ECU) relative to the location of the actuator under measurement may involve extensive electrical wiring that may not include shielding to protect against potential EMI. Additionally, wiring bundles carrying the signal to the controller may include other system actuators in close proximity exhibiting EMI inducing behavior. Due to the use of relays and other electrical connections throughout the vehicle 10, the system-level EMI noise may be caused by any high current event, such as accessory use, trailer wiring, etc., for example and without limitation.

Beginning at 402, motor current data from the EBCM 171 is transmitted to both the EMI assessment module 176 and the brake pad wear determination module 174. As discussed herein, each of the EMI assessment module 176 and the brake pad wear determination module 174 are housed within or in electronic communication with a controller, such as the controller 22. The motor current data is actual EPB current data.

The EMI assessment performed at 406 includes a comparison of the total battery current draw with measured EPB current draw to identify a potential EMI impact on data acquisition. Because the brake pad wear determination is based on a series of measurements, the EMI assessment identifies which data points are inaccurate and should be discarded from the series, thus improving the overall accuracy of the brake pad wear determination. The EMI assessment performed at 406 also includes historical EPB motor position data along with the EPB motor position determined each time the EPB MOC brake pad wear test is performed (obtained at 412) and compares the historical and instant motor positions against an expected range of motor positions provided by an energy-based model calculation of brake pad wear (obtained at 416). From these comparisons, the controller 22 determines the potential of EMI in the data acquisition.

In various embodiments, for each EPB MOC test, the resulting motor displacement travel can be described by the following equation:

$$D_i^{exp} = D_{i-1}^{meas} + \int_0^T w(t)dt \text{ for } i=1,2,\ldots N \qquad \text{Equation 1}$$

where $D_i^{exp}$ is the expected motor displacement travel at test instance i, $D_{i-1}^{meas}$ is the actual measured distance from the last test, and w(t) is the energy-based function representing pad wear behavior over time, which itself is a function of brake pressure, brake contact surface temperature, and speed, among other factors. Integration of this function, or equivalently, accumulating instantaneous wear over time t provides expected pad wear due to friction braking over time.

T denotes the time passed between test i−1 to test i.

If the difference $\Delta = D_i^{meas} - D_i^{exp}$ at test i is greater than a threshold, then the method 400 proceeds with comparing the actual EPB measurement current versus the bulk data current coming from the intelligent battery management sensor 408.

In various embodiments, the threshold can be calculated using +/−4 times the standard deviation, σ, of the specified measurement method. The threshold takes into consideration that each measurement method has a repeatability tolerance represented by the standard deviation.

The EPB current data is received by the EMI assessment module 176 and is used by the controller, such as the controller 22, to determine a margin of current at 404. The controller determines the margin of current using the actual EPB current data as well as current data from an intelligent battery management sensor 408. The intelligent battery management sensor 408 provides data regarding battery current and battery state of charge (SOC) and/or battery state of health (SOH). The comparison of the EPB current data with the battery or system level current data is used by the controller 22 to perform an EMI assessment at 406.

In addition to the motor displacement calculation, a calibrated threshold of bulk vehicle current draw from the intelligent battery management sensor 408 is held as a criteria for accepting the motor displacement calculation. This is most effective in detecting long duration events of current draw which indicate that another device in the vehicle or connected to the vehicle is consuming current and possibly coupling noise to the measurement system. The other parameter checked from the intelligent battery management sensor 408 is the battery state of charge (SOC) which accumulates all current draw and charge events at a significantly faster sampling rate to provide an estimate of the charge remaining in the battery. A change in battery SOC during a pad height measurement by the brake pad wear determination module 174 over a threshold established by a 3-factor map of vehicle temperature, system voltage, and a running weighted average of previous measurements is also held as a criteria for accepting the displacement calculation. Finally, the system voltage measurement performed by the EBCM 171 serves to qualify the factors of long duration current draw and battery SOC change criteria. This is performed in both cases by excluding displacement results where system voltage varied at any point during the measurement over a threshold value. The threshold is established by analyzing test data including the mapped average variations over new and worn motor assemblies from vehicle durability data captured during vehicle platform development, for example and without limitation. An additional criteria of variation between a short measurement before and after the displacement test while battery current draw is below a calibrated threshold, representing only the current being consumed by the minimum vehicle controllers active during this test, is held as a final criteria for displacement calculation data acceptance.

Once the assessment is performed at 406, next, at 410, the controller 22 determines whether a first condition is satisfied, that is, the data acquisition or measurement is acceptable. In various embodiments, the first condition is an electromagnetic interference level that is within an acceptable range or below a predetermined limit.

A primary indicator of electromagnetic interference is the elevation of the system noise floor such that the pulses that are intended to be detected are within the noise floor. This manifests as missing pulses in the period of measurements which would normally be accompanied by a drastic increase in bulk current draw by the park brake motor as the onset of a stall condition. Instead, when these pulses are missed, the controller 22 determines that either an unlikely failure such as brush failure, immediate motor load change, or other rarity has occurred or that, more likely, the system was affected by electromagnetic interference at some level. In nearly the opposite case, an increased frequency or a quicker than normal occurrence of the intended pulse, while possible from an unlikely source such as immediate motor load change or brush skip, is also a more likely indicator of electromagnetic interference. In all cases, the comparisons between historical EPB motor position data and EPB motor position data at the time of testing and a comparison of historical and instant motor positions against an expected range of motor positions provided by the energy-based model calculation of brake pad wear are effective in detection of these items in a less intrusive and more repeatable fashion.

When the first condition is not satisfied, the controller 22 has determined that EMI has occurred such that the measurement should be discarded. For a measurement to be acceptable, the EMI assessment should indicate that the system level EMI has not interfered in the measurement and analysis of the EPB motor current, that is, that current pulses have not been miscounted. In other words, a brake pad wear measurement is discarded when the controller 22 determines that the motor current data has been influenced by noise. Effects of the influence of EMI or noise on the motor current data include a motor current pulse count lower than an expected pulse count. Analysis of the EMI assessment performed at 406 confirms that voltage variations did not influence the brake pad wear test results by influencing the data used to perform the test. The EMI assessment enables the detection of fast changes in voltage within a range of voltages that would not be detected by other system measurements and also improves the accuracy of measurements taken at slower sampling rates used to save on processing power.

For example, when considering a single measurement cycle, two cases can exist. If EMI noise is additive, then the signal might emerge as an additional data point that is not consistent with the expected frequency of the data points for that particular measurement cycle. Alternatively, if EMI noise is subtractive, then the signal might instead emerge as a skipped data point that is not consistent with the expected frequency of the data points for that particular measurement cycle.

If the controller 22 determines that the first condition is satisfied, that is, the data acquisition is acceptable and EMI has not interfered with the data measurement, the brake pad wear determination module 174 proceeds to determine a revised brake pad wear estimation, as discussed in detail in U.S. patent application Ser. No. 15/802,711, and shown in brief schematically in FIG. 4.

Actual and historical motor position data, obtained at 412 and measured rotor wear, obtained at 414, along with expected brake pad wear from an energy-based model, obtained at 416, are used by the controller 22 at 418 to determine a brake pad wear estimation, shown at 420.

If the controller 22 determines that the first condition is not satisfied, that is, the data measurement has been affected by EMI, a fault detection signal is sent to the brake pad wear determination module 174 and the current data is discarded and not used for the brake pad wear determination. The analysis and evaluation of the motor current data shown in FIG. 4 continues as the data is continuously sampled to update the brake pad wear estimation.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for performing an electromagnetic interference assessment for a brake pad wear estimation, comprising:
providing a brake assembly including an electric park brake and a motor coupled to the electric park brake;
providing a sensor configured to provide battery current data;
providing a controller electronically connected to the brake assembly and the sensor;
receiving, by the controller, motor current data and measured motor travel data from the motor coupled to the electric park brake;
receiving, by the controller, the battery current data from the sensor;
calculating, by the controller, a margin of current from the motor current data and the battery current data;
calculating, by the controller, the brake pad wear estimation from the motor current data;
determining, by the controller, an expected motor travel of the motor coupled to the electric park brake;
analyzing, by the controller, the margin of current, the measured motor travel data, the expected motor travel, and the calculated brake pad wear estimation to determine if a first condition is satisfied;

when the first condition is satisfied, revising, by the controller, the calculated brake pad wear estimation using the motor current data; and when the first condition is not satisfied, discarding the motor current data.

2. The method of claim 1, wherein the expected motor travel is calculated as $$D_i^{exp} = D_{i-1}^{meas} + \int_0^T w(t)dt \text{ for } i=1,2,\ldots N, \text{ where}$$

$D_i^{exp}$ is the expected motor travel at a test instance i,
$D_{i-1}^{meas}$ is an actual measured motor travel distance from a previous test,
w(t) is an energy-based function representing a brake pad wear behavior of the electric park brake over time, and
T is an elapsed time between a test i−1 to a test i.

3. The method of claim 1, wherein the first condition is an electromagnetic interference level below a predetermined threshold such that the motor current data is determined to be valid.

4. The method of claim 3, wherein the electromagnetic interference level is determined from an analysis of pulses in a period of measurements of the motor current data.

5. The method of claim 4, wherein the analysis of pulses in the motor current data includes determining, by the controller, when one or more pulses are expected and missing in the motor current data, and, when the one or more pulses are missing in the motor current data, determining, by the controller, the electromagnetic interference level is above the predetermined threshold.

6. The method of claim 3, wherein the electromagnetic interference level is determined from an analysis of a frequency of pulses in a period of measurements of the motor current data.

7. The method of claim 6, wherein the analysis of the frequency of pulses in the motor current data includes determining when an increased frequency of an expected pulse is observed, and, when the increased frequency is observed, determining, by the controller, the electromagnetic interference level is above the predetermined threshold.

8. The method of claim 1 further comprising determining, by the controller, a calibrated threshold of the battery current data and discarding, by the controller, the measured motor travel data when the battery current is above the calibrated threshold.

9. A method for performing a data validity assessment for a brake pad wear estimation, comprising:
providing an electric park brake assembly including a motor and a battery management sensor and a controller in electronic communication with the electric park brake assembly and the battery management sensor;
receiving, by the controller, motor current data from the motor of the electric park brake assembly;
receiving, by the controller, battery current data from the battery management sensor;
determining, by the controller, a margin of current from the motor current data and the battery current data;
receiving, by the controller, historical motor position data of the motor and instant motor position data of the motor;
calculating, by the controller, the brake pad wear estimation using the motor current data;
comparing, by the controller, the historical motor position data and the instant motor position data against an expected range of motor positions;
determining, by the controller, an electromagnetic interference level from the margin of current, the historical and instant motor position data, and the calculated brake pad wear estimation; and
discarding, by the controller, the motor current data when the electromagnetic interference level is above a predetermined threshold.

10. The method of claim 9 further comprising determining, by the controller when the electromagnetic interference level is below a predetermined threshold that the motor current data is determined to be valid.

11. The method of claim 10 further comprising revising, by the controller, the calculated brake pad wear estimation using the motor current data when the motor current data is determined to be valid.

12. The method of claim 11, wherein the electromagnetic interference level is determined from an analysis of pulses in a period of measurements of the motor current data.

13. The method of claim 12, wherein the analysis of pulses in the motor current data includes determining, by the controller, when one or more pulses are expected and missing in the motor current data, and, when the one or more pulses are missing in the motor current data, determining, by the controller, that the electromagnetic interference level is above the predetermined threshold.

14. The method of claim 11, wherein the electromagnetic interference level is determined from an analysis of a frequency of pulses in a period of measurements of the motor current data.

15. The method of claim 14, wherein the analysis of the frequency of pulses in the motor current data includes determining when an increased frequency of an expected pulse is observed, and, when the increased frequency is observed, determining, by the controller, the electromagnetic interference level is above the predetermined threshold.

16. An automotive vehicle, comprising:
a vehicle body enclosing a propulsion system including a vehicle battery and a wheel coupled to the vehicle body;
a sensor coupled to the vehicle battery and configured to provide battery current data;
a brake assembly coupled to the wheel, the brake assembly including an electric park brake and a motor coupled to the electric park brake; and
a controller electronically connected to the brake assembly and the sensor, the controller configured to:
receive motor current data and measured motor travel data from the motor coupled to the electric park brake;
receive battery current data from the sensor coupled to the vehicle battery;
calculate a margin of current from the motor current data and the battery current data;
calculate a brake pad wear estimation from the motor current data;
determine an expected motor travel of the motor coupled to the electric park brake;
analyze the margin of current data, the measured motor travel data, the expected motor travel, and the calculated brake pad wear estimation to determine if a first condition is satisfied;
when the first condition is satisfied, revise the calculated brake pad wear estimation using the motor current data; and
when the first condition is not satisfied, discard the motor current data.

17. The automotive vehicle of claim 16, wherein the expected motor travel is calculated as $D_i^{exp} = D_{i-1}^{meas} + \int_0^T w(t)dt$ for $i=1,2,\ldots N$, where $D_i^{exp}$ is the expected motor travel at a test instance i,
$D_{i-1}^{meas}$ is an actual measured motor travel distance from a previous test,
w(t) is an energy-based function representing brake pad wear behavior over time, and
T is an elapsed time between a test i−1 to a test i.

18. The automotive vehicle of claim 16, wherein the first condition is an electromagnetic interference level below a predetermined threshold such that the motor current data is determined to be valid.

19. The automotive vehicle of claim 18, wherein the controller is further configured to determine the electromagnetic interference level from an analysis of pulses in a period of measurements of the motor current data.

20. The automotive vehicle of claim 19, wherein the analysis of pulses in the motor current data includes determining when one or more pulses are expected and missing in the motor current data, and, when the one or more pulses are missing in the motor current data, determining the electromagnetic interference level is above the predetermined threshold.

\* \* \* \* \*